United States Patent
Moffatt et al.

(10) Patent No.: US 9,910,576 B2
(45) Date of Patent: Mar. 6, 2018

(54) AUTOMATED MULTIMEDIA CONTENT EDITING

(71) Applicant: International Business Machines Corporation, Armonk, NY (US)

(72) Inventors: Edwin P. J. Moffatt, Winchester (GB); Richard W. Pilot, Southampton (GB); Luke P. Staddon, Surrey (GB)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 14/531,213

(22) Filed: Nov. 3, 2014

(65) Prior Publication Data
US 2015/0128048 A1    May 7, 2015

(30) Foreign Application Priority Data

Nov. 7, 2013   (GB) .................................. 1319672.0

(51) Int. Cl.
G11B 27/34       (2006.01)
G06F 3/0484      (2013.01)
G11B 27/031      (2006.01)

(52) U.S. Cl.
CPC ........ *G06F 3/04847* (2013.01); *G11B 27/031* (2013.01); *G11B 27/34* (2013.01)

(58) Field of Classification Search
CPC ...... G06F 9/4443; G11B 27/031; G11B 27/34
See application file for complete search history.

(56) References Cited

U.S. PATENT DOCUMENTS

| 5,737,476 | A |   | 4/1998 | Kim |
|-----------|---|---|--------|-----|
| 6,111,575 | A | * | 8/2000 | Martinez ............... G06F 9/4443 715/234 |
| 6,226,785 | B1 |  | 5/2001 | Peterson et al. |
| 6,699,127 | B1 |  | 3/2004 | Lobb et al. |
| 6,757,027 | B1 |  | 6/2004 | Edwards et al. |
| 8,503,862 | B2 |  | 8/2013 | Hsieh et al. |

(Continued)

FOREIGN PATENT DOCUMENTS

EP       2662760 A2    11/2013

OTHER PUBLICATIONS

Application No. GB1319672.0, entitled "Automated Multimedia Content Editing" filed Nov. 7, 2013.

(Continued)

*Primary Examiner* — William Bashore
*Assistant Examiner* — Daniel Parcher
(74) *Attorney, Agent, or Firm* — Tihon Poltavets

(57) ABSTRACT

Disclosed is a method for editing multimedia content, the multimedia content comprising a demonstration of actions performed in utilizing a computer application, the computer application having an "undo" history, the method comprising the steps of: receiving an "undo" history from the computer application; detecting an indication of an action being removed from the "undo" history; adding an end marker to a timeline associated with the multimedia content at a time corresponding to such detection; adding a start marker to said timeline at a time corresponding to the action which was removed from the "undo" history; and removing a portion of the multimedia content corresponding to that located between the start marker and the end marker.

12 Claims, 4 Drawing Sheets

(56) References Cited

U.S. PATENT DOCUMENTS

| | | | |
|---|---|---|---|
| 2005/0002643 A1 | 1/2005 | Smith | |
| 2009/0293018 A1* | 11/2009 | Wilson | G06F 17/30899 |
| | | | 715/811 |
| 2012/0089906 A1* | 4/2012 | Reeves | H04L 67/1095 |
| | | | 715/255 |
| 2012/0272173 A1 | 10/2012 | Grossman et al. | |
| 2013/0011121 A1 | 1/2013 | Forsyth et al. | |
| 2013/0305151 A1* | 11/2013 | Muser | G06F 3/0481 |
| | | | 715/704 |
| 2015/0128044 A1* | 5/2015 | Lee | H04N 5/2258 |
| | | | 715/719 |

OTHER PUBLICATIONS

"How to cut unnecessary parts from your video?", You Tube, Uploaded on Apr. 11, 2011, <http://www.youtube.com/watch?v=MZx1HdgHBro>.

How to Remove Unnecessary Audio with Audacity, URL provided by searcher in search report dated Sep. 25, 2013, <http://www.wikihow.com/Remove-Unnecessary-Audio-with-Audacity>.

Intellectual Property Office, Application No. GB1319672.0, Search Report, Apr. 22, 2014.

* cited by examiner

AUTOMATED MULTIMEDIA CONTENT EDITING

BACKGROUND OF THE INVENTION

The present invention relates to automated editing of multimedia content and more particularly to the removal of unnecessary portions of multimedia content.

In educating users of computer applications, it is common to produce screen capture tutorial multimedia content in which a demonstrator explains what they are doing as they use the computer application to carry out one or more actions. The screen capture tutorial multimedia content typically includes: (i) video captured from a display screen displaying the computer application being executed; and (ii) audio spoken by the demonstrator explaining what can be seen and/or what actions are being performed. During the process of recording the screen capture tutorial multimedia content, it is likely that the demonstrator will make mistakes that they wish to undo. For a viewer of the screen capture tutorial multimedia content, it is unlikely that watching these mistakes will be useful. The editor of the multimedia content is required to go through the multimedia content with the aim of removing those sections containing mistakes and which are not useful to the viewer.

Presently, this is done by an editor viewing all of the multimedia content after it has been recorded, and then manually editing out any sections containing mistakes. The main disadvantage of this approach is the time that it takes the editor to perform this operation. This disadvantage is particularly relevant when the editor is inexperienced or the multimedia content is particularly long.

As an example, a demonstrator is recording a tutorial on how to use the Eclipse integrated development environment to write Java code (Eclipse is a trademark of Eclipse Foundation, Inc. and Java is a trademark of Oracle, Inc). During the tutorial, the demonstrator accidentally creates a method that they did not need to create, so the demonstrator uses either the keyboard combination "Ctrl+Z" or the 'undo' button to undo the most recent change from the editor. The demonstrator then resumes their audio voice-over as if they had not made that mistake. In post-processing, the editor views the multimedia content to find the mistake, and then uses video editing software to remove that section of the multimedia content.

SUMMARY

According to an aspect of the present invention, there is a method, computer program product and/or system for editing multimedia content, the multimedia content comprising a demonstration of actions performed in utilizing a computer application, the computer application having an "undo" history, that performs the following steps (not necessarily in the following order): receiving an "undo" history from the computer application; (ii) detecting an indication of an action being removed from the "undo" history; (iii) adding an end marker to a timeline associated with the multimedia content at a time corresponding to such detection; (iv) adding a start marker to the timeline at a time corresponding to the action which was removed from the "undo" history; and (v) removing a portion of the multimedia content corresponding to that located between the start marker and the end marker.

DETAILED DESCRIPTION

Figure 1:
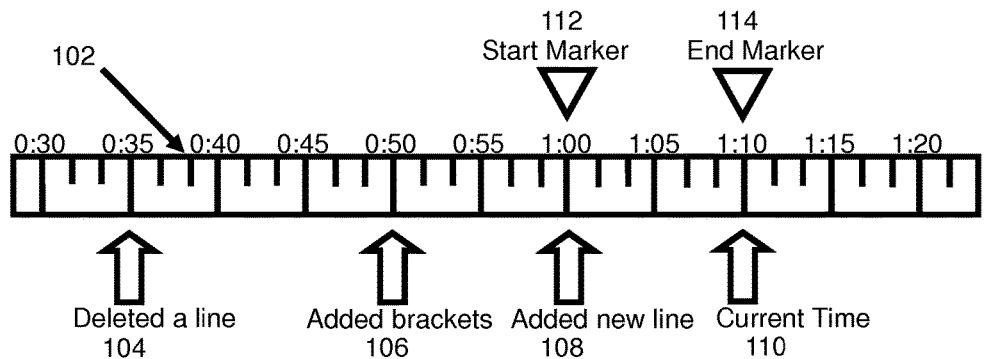
FIG. 1 shows a timeline of multimedia content with actions taken by a demonstrator of a computer application and start and end markers for a section of multimedia content to be deleted.

FIG. 1 shows a timeline 102 of multimedia content. Multimedia content in general may include a combination of text, audio, still images, animation, video, or interactivity content forms. In embodiments of the present invention, typically the multimedia content consists of captured screen images forming video and captured audio from a demonstrator. In many embodiments, the demonstrator is a person providing a screen capture based tutorial of a software application. Optionally, the multimedia content may include captured video showing the demonstrator, for example, inset in a small window on the display screen of the computer system on which the computer application is being demonstrated.

In one embodiment (shown in FIG. 1), at about time 0:35, a demonstrator of the computer application deletes 104 a line. At about time 0:50, a demonstrator of the computer application adds 106 brackets. At about time 1:00, a demonstrator of the computer application adds 108 a new line. At about time 1:10, a demonstrator of the computer application decides that adding 108 a new line was a mistake. The demonstrator decides that the step of adding 108 a new line needs to be undone. The step of undoing the addition 108 of the new line may be achieved, for example, by the keyboard combination "Ctrl+Z", by the pressing an 'undo' button in a graphical user interface or by selecting an "undo" option from a menu. Ways of implementing an "undo" operation are well known to the person skilled in the art.

Figure 2:
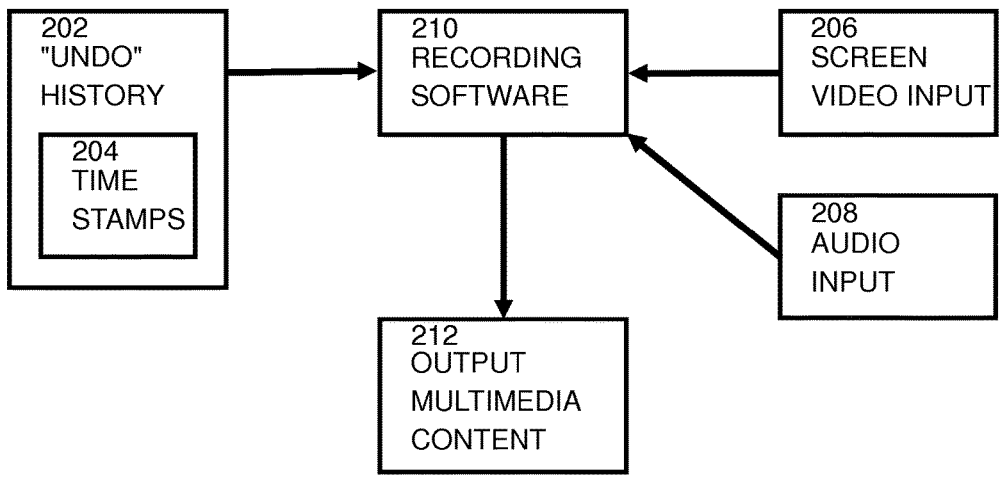
FIG. 2 shows a first embodiment of a system in which embodiments of the present invention may be implemented.

FIG. 2 shows a first embodiment of a system in which embodiments of the present invention may be implemented. Recording software 210 receives video input 206 formed of captured screen images. The video input is the content that is displayed on the computer screen of the computer application being demonstrated. The video input may be captured by direct receipt of analog or digital information or even by the use of a camera capturing an image from the screen. Recording software 210 also receives audio input 208 from the demonstrator who is demonstrating using the computer application.

The recording software 210 further receives an "undo" history 202 of the computer application which is being demonstrated. The recording software 210 gains access to the "undo" history 202 by (i) having the computer application being demonstrated print its "undo" history 202 to a log file shared between the computer application and the recording software 210; (ii) the computer application being demonstrated exposing an Application Program Interface (API) that allows external programs or plug-ins to enquire on the current state of the "undo" history; or (iii) adding a monitoring plugin to the computer application being demonstrated to interrogate computer application actions including "undo" history 202, such as via the Eclipse Enabler package, provided by Rational Functional Tester (Rational is a trademark of IBM Corp.).

In the first approach, the recording software 210 simply monitors the "undo" history file 202 and take snapshots at an appropriate interval. In the second approach, the recording software 210 uses the API to obtain "undo" history 202 snapshots and then processes and/or stores timestamped entries itself. In the third approach, instead of monitoring an "undo" history 202 log file, a plugin will actively listen for events in the "undo" history 202 (pull rather than push).

In an embodiment, the "undo" history 202 includes timestamps 204 associated with each of the actions in the "undo" history 202. These timestamps 204 are also received by the recording software 210. The recording software 210 produces output multimedia content 212 in which mistakes made by the demonstrator are undone using embodiments of methods of the present invention.

Figure 3:
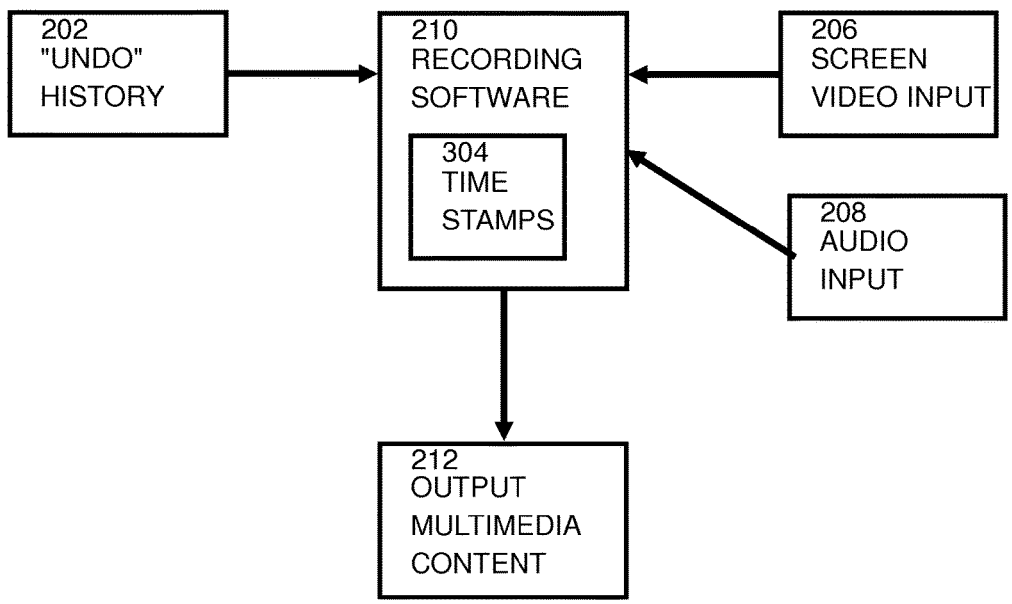
FIG. 3 shows a second embodiment of a system in which embodiments of the present invention may be implemented.

FIG. 3 shows another embodiment of a system in which the "undo" history 202 does not includes timestamps associated with each of the actions in the "undo" history 202. In this embodiment, the recording software 210 itself associates a timestamp 304 with each entry in the "undo" history 202.

During the process of recording the multimedia content, the recording software 210 and the computer application it is monitoring proceed as they would normally until the demonstrator decides to undo a mistake they have made.

Figure 4:
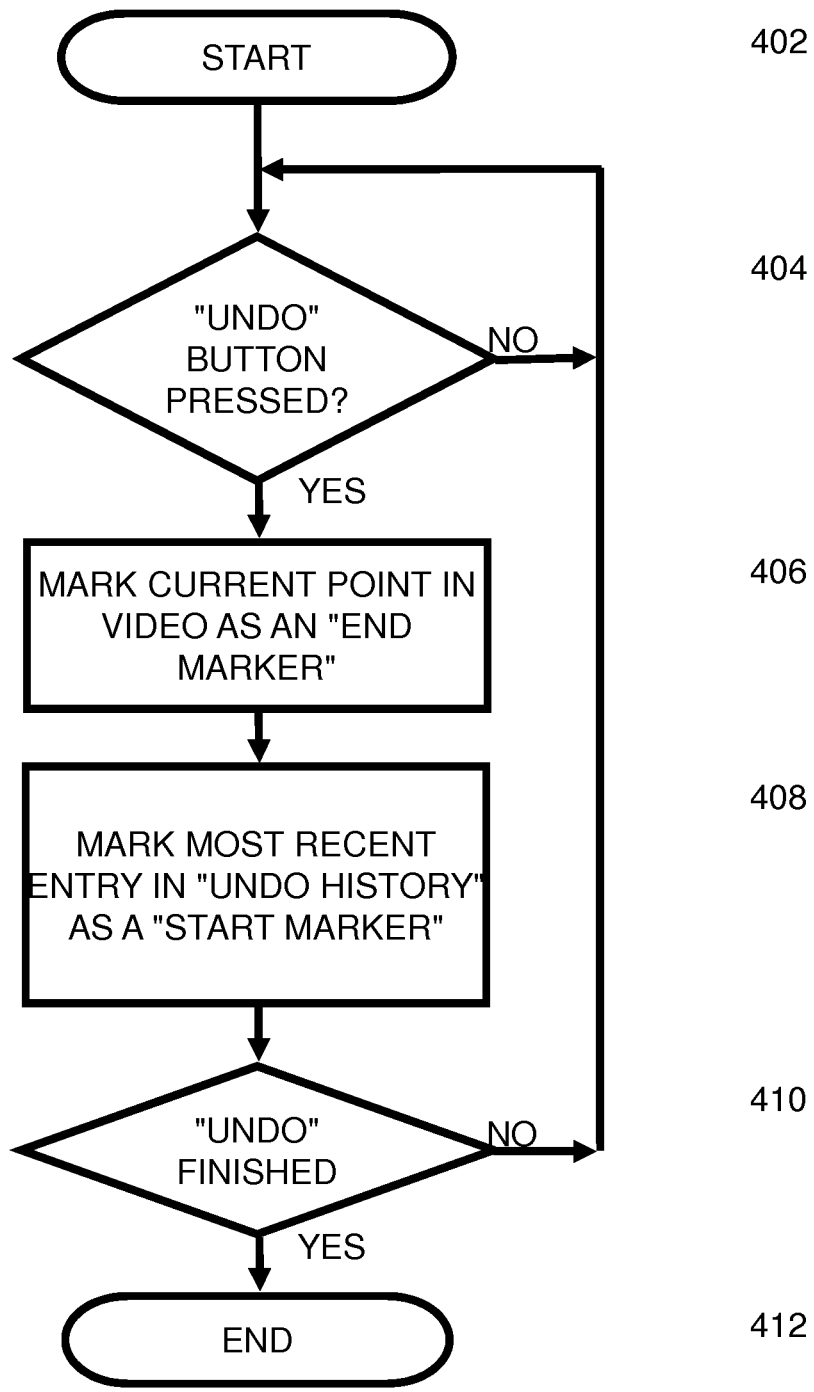
FIG. 4 shows a flow chart of an embodiment of a method for inserting start and end markers identifying sections of multimedia content to be deleted.

FIG. 4 shows a flow chart of an embodiment of a method for inserting start and end markers identifying sections of multimedia content containing mistakes to be deleted. The method starts at step 402. At step 404, a check is made to see if the demonstrator has made a mistake and, for example, pressed the "undo" button (or as mentioned above uses the keyboard combination "Ctrl+Z", an "undo" option from a menu or any other way of initiating and "undo" operation). If the "undo" button has not been pressed, then processing returns to step 404. If the "undo" button has been pressed, then at step 406, the recording software 210 marks the current time 110 point on the timeline 102 of the multimedia content as an "end marker" 114. At step 408, the recording software 210 also marks a point on the timeline 102 as a "start marker" 112. The point on the time line 102 which is marked as a "start marker" 112 is that corresponding to the timestamp for the most recent entry in the previous "undo" history 202 snapshot obtained by the recording software 210 using one of the three methods described above or by any other method. This most recent entry in the "undo" history is the item which will be undone. The multimedia content corresponding to the timeline 102 between the "start marker" 112 and the "end marker" 114 is that in which the demonstrator has made a mistake. This portion of the multimedia content is to be deleted when post-processing is done on the multimedia content.

At step 410, a check is made to see if the "undo" process has finished. If the "undo" process has finished and the performance of further operations is resumed as part of the demonstration, then the method ends at step 412. If the "undo" process has not finished, (for example, the demonstrator is carrying out further "undo" operations before performing further actions as part of the demonstration) then processing returns to step 404.

Figure 5:
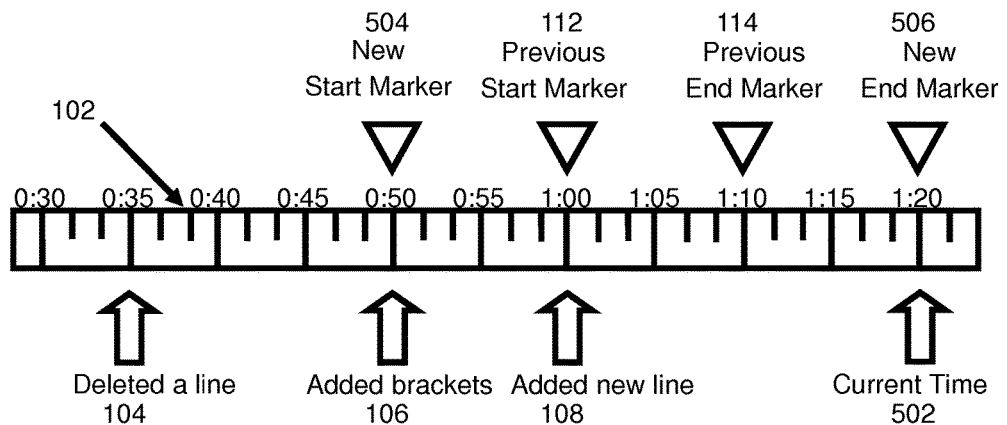
FIG. 5 shows the timeline of FIG. 1 with revised start and end markers for a section to be deleted.

FIG. 5 shows the timeline of FIG. 1 with revised start and end markers for a section to be deleted. These revised markers are updated when the demonstrator carries out further undo operations before performing further actions as part of the demonstration. In FIG. 1, the demonstrator performed an "undo" operation on the "Added new line" 108 action. The further undo operation may be, for example, the "Added brackets" 106 operation. If another undo operation is required, the recording software 210 updates the current start marker 112 and current end marker 114 instead of creating a new start marker 112 and a new end marker 114. The previous end marker 114 will be replaced by a new end marker 506 that corresponds to the current time 502 of the most recent undo operation. The start marker 112 will be replaced by a new start marker corresponding to the most recent entry 106 on the original snapshot of the "undo" history 202.

If, upon the next snapshot of the "undo" history 202, the recording software 210 notices that more actions have been added to the "undo" history 202, the recording software 210 will carry on recording until another mistake is make by the demonstrator. If and when another mistake is made by the demonstrator, the recording software 210 then repeats the method shown in FIG. 4 using a new start marker 112 and a new end marker 114.

Figure 6:
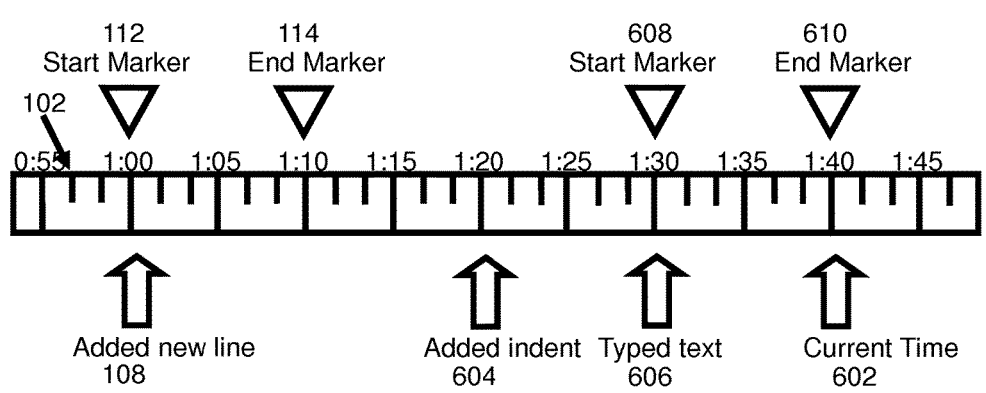
FIG. 6 shows the timeline of FIG. 1 with two sets of start and end markers for two sections to be deleted.

FIG. 6 shows a portion of the timeline of FIG. 1 with a second start marker 608 and a second end marker 610 showing another section to be deleted because a second separate mistake was made by the demonstrator. A further action "Added indent" 604, which is not to be undone, was performed between the first mistake ("Added new line" 108) and the second mistake ("Typed text" 606). The timeline of FIG. 1 shows correct actions of "Deleted a line" 104 and "Added brackets" 106. This portion has been omitted from FIG. 6 for clarity. In FIG. 6 is shown the subsequent action of "Added new line" 108 which has been undone and therefore has start marker 112 and end marker 114 associated with it through operation of the method of FIG. 4. Multimedia content associated with this mistake, located between start marker 112 and end marker 114, and made by the demonstrator is to be deleted during post-processing. A further subsequent action "Added an indent" 604 was correctly completed by the demonstrator. Another subsequent action "Typed text" 606 by the demonstrator was completed in error. Using the method of FIG. 4, at current time 602, the portion of the multimedia content between times 1:30 and 1:40 is marked by start marker 608 and end marker 610 to be deleted during post processing.

The net result of FIG. 6, together with the portion of FIG. 1 omitted from FIG. 6 is that actions of "Deleted a line" 104 and "Added brackets" 106, "Added new line" 108, "Added an indent" 604 and "Typed text" 606 were carried out by the demonstrator and multimedia content corresponding to these actions created. The demonstrator has undone the "Added new line" 108 and "Typed text" 606 actions, leaving the "Deleted a line" 104 and "Added brackets" 106 and "Added an indent" 604 actions to be included in the final multimedia content. The "Added new line" 108 and "Typed text" 606 actions are to be deleted from the multimedia content during post-processing using the start marker 112 and end marker 114 associated with the "Added new line" 108 action and the start marker 608 and end marker 610 associated with the "Typed text" 606 action to define the portion of multimedia content to be deleted. The start markers 112, 608 were obtained from the timestamp associated the actions in the undo history or generated by the recording software 210 from the snapshot of the "undo" history 202 as associated with the actions in the "undo" history 202. The end markers 114, 610 were obtained from the "Current time" at which the demonstrator has indicated that the action is to be undone. No manual input identifying the sections of multimedia content to be deleted has been necessary.

Figure 7:
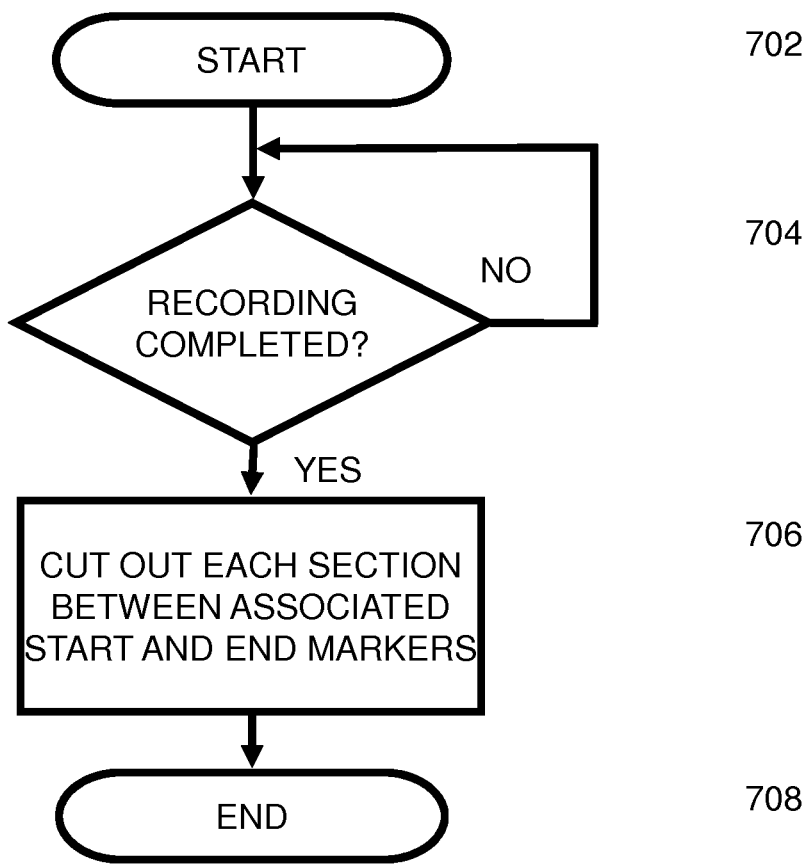
FIG. 7 shows a flow chart of an embodiment of a method for deleting sections of multimedia content which have been previously marked.

FIG. 7 shows a flow chart of an embodiment of a method for deleting sections of multimedia content which have been previously marked. The method starts at step 702. At step 704, a check is made as to whether the recording has been completed. If the recording has not been completed, then processing returns to step 704. At step 706, the recording software 210 has completed recording. The recording software 210 reviews the multimedia content, deleting sections of multimedia content located between respective start markers 112, 608 and end markers 114, 610. In this way, the demonstrator does not have to edit the multimedia content manually. In an embodiment, the sections between pairs of start markers 112, 608 and end markers 114, 610 may be shown to the user to confirm that the sections should be deleted. In a variation of this embodiment, the demonstrator may be allowed to adjust the position of the markers so as, for example, to avoid any audio being cut off. In this variation of the embodiment, the demonstrator is still saving a large amount of time, as the demonstrator no longer needs to watch all of the multimedia content to discover where their mistakes were. The final multimedia content file is a single file, with the portions between respective start markers 112, 608 and the end markers 114, 610 removed.

Embodiments of the invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-RW), and DVD.

What is claimed is:

1. A method comprising:
 receiving, by a computer, a first "undo" history and a second "undo" history from a first computer application, wherein the first "undo" history corresponds to reversing a first input performed in the first computer application and the second "undo" history corresponds to reversing a second input performed in the first computer application, wherein the first "undo" history corresponds to a first undo button press and the second "undo" history corresponds to a second undo button press;
 adding, by the computer, a first end marker to a timeline of a multimedia content in a second computer application at a time corresponding to when the first "undo" history was received;
 adding, by the computer, a second end marker to the timeline of the multimedia content in the second computer application at a time corresponding to when the second "undo" history was received;
 adding, by the computer, a first start marker to the timeline of the multimedia content in the second computer application at a time corresponding to when the first input was performed in the first computer application;
 adding, by the computer, a second start marker to the timeline of the multimedia content in the second computer application at a time corresponding to when the second input was performed in the first computer application; and
 removing, by the computer, a first portion of the multimedia content that is nonadjacent to a second portion of the multimedia content, simultaneously with the second portion of the multimedia content, wherein the first portion corresponds to multimedia content between the first start maker and the first end marker, wherein the second portion corresponds to multimedia content between the second start maker and the second end marker.

2. The method of claim 1, wherein the step of receiving, by the computer, the first "undo" history and the second "undo" history from the first computer application includes the first computer application storing the first "undo" history and the second "undo" history at a location capable of being accessed externally to the computer application.

3. The method of claim 1, wherein the step of receiving, by the computer, the first "undo" history and the second "undo" history from the first computer application includes receiving the first "undo" history and the second "undo" history via an application program interface.

4. The method of claim 1, wherein the step of receiving, by the computer, the first "undo" history and the second "undo" history the first computer application includes adding a plugin to the first computer application to allow access to the first "undo" history and the second "undo" history.

5. A computer system comprising:
 a processor(s) set; and
 a computer readable storage medium;
 wherein:
 the processor set is structured, located, connected, and/or programmed to run program instruction stored on the computer readable storage medium; and
 the program instructions include:
 program instructions programmed to receive a first "undo" history and a second "undo" history from a first computer application, wherein the first "undo" history corresponds to reversing a first input performed in the first computer application and the second "undo" history corresponds to reversing a second input performed in the first computer application, wherein the first "undo" history corresponds to a first undo button press and the second "undo" history corresponds to a second undo button press;
 program instructions programmed to add a first end marker to a timeline of a multimedia content in a second computer application at a time corresponding to when the first "undo" history was received;
 program instructions programmed to add a second end marker to the timeline of the multimedia content in the second computer application at a time corresponding to when the second "undo" history was received;
 program instructions programmed to add a first start marker to the timeline of the multimedia content in the second computer application at a time corresponding to when the first input was performed in the first computer application;

program instructions programmed to add a second start marker to the timeline of the multimedia content in the second computer application at a time corresponding to when the second input was performed in the first computer application; and program instructions programmed to remove a first portion of the multimedia content that is nonadjacent to a second portion of the multimedia content, simultaneously with the second portion of the multimedia content, wherein the first portion corresponds to multimedia content between the first start maker and the first end marker, wherein the second portion corresponds to multimedia content between the second start maker and the second end marker.

6. The system of claim 5, wherein program instructions to receive the first "undo" history and the second "undo" history from the first computer application includes the first computer application storing the first "undo" history and the second "undo" history at a location capable of being accessed externally to the computer application.

7. The system of claim 5, wherein program instructions to receive the first "undo" history and the second "undo" history from the first computer application includes receiving the first "undo" history and the second "undo" history via an application program interface.

8. The system of claim 5, wherein program instructions to receive the first "undo" history and the second "undo" history the first computer application includes adding a plugin to the first computer application to allow access to the first "undo" history and the second "undo" history.

9. A computer program product comprising a computer readable storage medium having stored thereon:

program instructions programmed to receive a first "undo" history and a second "undo" history from a first computer application, wherein the first "undo" history corresponds to reversing a first input performed in the first computer application and the second "undo" history corresponds to reversing a second input performed in the first computer application, wherein the first "undo" history corresponds to a first undo button press and the second "undo" history corresponds to a second undo button press;

program instructions programmed to add a first end marker to a timeline of a multimedia content in a second computer application at a time corresponding to when the first "undo" history was received;

program instructions programmed to add a second end marker to the timeline of the multimedia content in the second computer application at a time corresponding to when the second "undo" history was received;

program instructions programmed to add a first start marker to the timeline of the multimedia content in the second computer application at a time corresponding to when the first input was performed in the first computer application;

program instructions programmed to add a second start marker to the timeline of the multimedia content in the second computer application at a time corresponding to when the second input was performed in the first computer application; and program instructions programmed to remove a first portion of the multimedia content that is nonadjacent to a second portion of the multimedia content, simultaneously with the second portion of the multimedia content, wherein the first portion corresponds to multimedia content between the first start maker and the first end marker, wherein the second portion corresponds to multimedia content between the second start maker and the second end marker.

10. The computer program product of claim 9, wherein program instructions to receive the first "undo" history and the second "undo" history from the first computer application includes the first computer application storing the first and the second "undo" history at a location capable of being accessed externally to the computer application.

11. The computer program product of claim 9, wherein program instructions to receive the first "undo" history and the second "undo" history from the first computer application includes receiving the first and the second "undo" history via an application program interface.

12. The computer program product of claim 9, wherein program instructions to receive the first "undo" history and the second "undo" history the first computer application includes adding a plugin to the first computer application to allow access to the first "undo" history and the second "undo" history.

* * * * *